United States Patent
Okawa et al.

(10) Patent No.: US 9,660,575 B2
(45) Date of Patent: May 23, 2017

(54) SOLAR CELL STRINGER CALIBRATOR

(71) Applicants: David Okawa, San Bruno, CA (US);
Sunny Sethi, San Bruno, CA (US);
Amiel Batayon, Laguna (PH)

(72) Inventors: David Okawa, San Bruno, CA (US);
Sunny Sethi, San Bruno, CA (US);
Amiel Batayon, Laguna (PH)

(73) Assignee: SunPower Corporation, San Jose, CA (US)

( * ) Notice: Subject to any disclaimer, the term of this patent is extended or adjusted under 35 U.S.C. 154(b) by 537 days.

(21) Appl. No.: 14/229,506

(22) Filed: Mar. 28, 2014

(65) Prior Publication Data

US 2015/0280643 A1    Oct. 1, 2015

(51) Int. Cl.
*H02S 50/10* (2014.01)
(52) U.S. Cl.
CPC .................................... *H02S 50/10* (2014.12)
(58) Field of Classification Search
CPC ....................................................... H02S 50/10
See application file for complete search history.

(56) References Cited

U.S. PATENT DOCUMENTS

| | | | | |
|---|---|---|---|---|
| 2003/0127124 A1* | 7/2003 | Jones | ................... | H01L 31/188 136/244 |
| 2009/0266398 A1* | 10/2009 | Metin | ............. | H01L 31/022425 136/244 |
| 2012/0080508 A1* | 4/2012 | Schultz | ................ | B23K 1/0016 228/179.1 |
| 2013/0272833 A1* | 10/2013 | Duncan | ................. | H01L 31/188 414/737 |

* cited by examiner

*Primary Examiner* — Manuel Rivera Vargas
(74) *Attorney, Agent, or Firm* — Blakely Sokoloff Taylor Zafman LLP

(57) ABSTRACT

A solar cell stringer calibrator has been disclosed. In an example, a method includes loading a base having pressure sensors into a solar cell stringer to be positioned under a tacking head. The tacking head is lowered onto the base. The pressure sensors measure pressure applied by the tacking head. The method involves determining whether the pressure applied by the tacking head is within a predetermined range. In another example, a method involves heating a solder joint, and measuring a temperature of the solder joint with a pyrometer and a temperature sensor, the temperature sensor disposed under the solder joint. The location of the pyrometer relative to the solder joint is determined based on a difference in temperatures measured with the pyrometer and the temperature sensor. The method involves adjusting the solar cell stringer if the location of the pyrometer is determined to be outside a predetermined range.

10 Claims, 10 Drawing Sheets

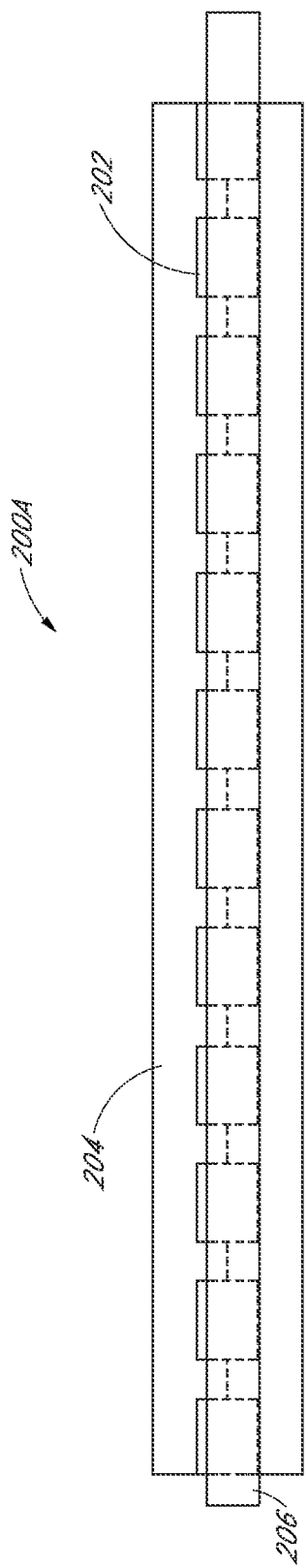
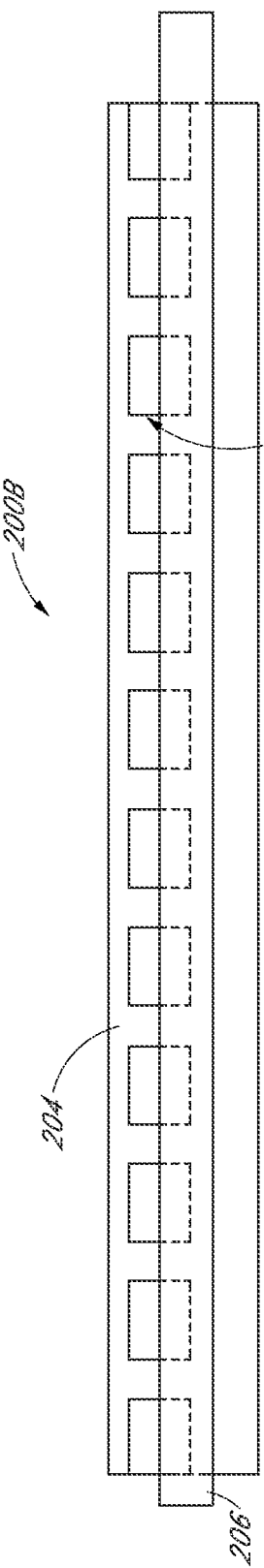
FIG. 2A
FIG. 2B

SOLAR CELL STRINGER CALIBRATOR

TECHNICAL FIELD

Embodiments of the present disclosure are in the field of renewable energy and, in particular, include methods and systems for solar cell stringer calibration.

BACKGROUND

Photovoltaic cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of, and entering into, the substrate creates electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit coupled thereto.

Techniques for increasing the efficiency in the manufacture of solar cells are generally desirable. Some embodiments of the present disclosure allow for increased solar cell manufacturing efficiency by providing novel processes for fabricating solar cell structures.

BRIEF DESCRIPTION OF THE DRAWINGS

FIG. 2A is a block diagram illustrating an example of a string of well-aligned solar cells on a carrier, in accordance with an embodiment of the present disclosure.

FIG. 2B is a block diagram illustrating an example of a string of misaligned solar cells on a carrier, in accordance with an embodiment of the present disclosure.

DETAILED DESCRIPTION

Figure 1:
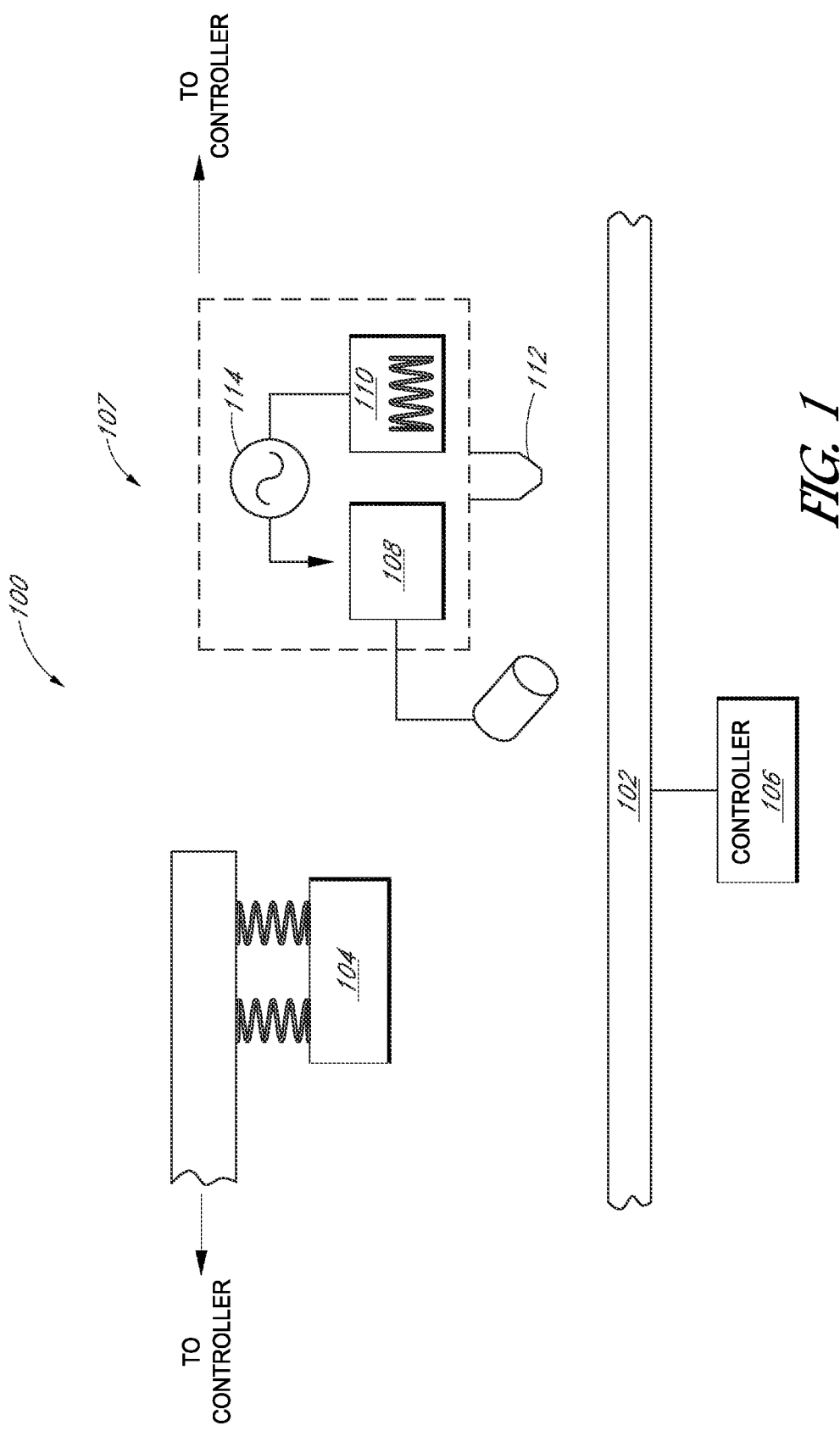
FIG. 1 is a block diagram of a solar cell stringer in which embodiments may be implemented, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar cell does not necessarily imply that this solar cell is the first solar cell in a sequence; instead the term "first" is used to differentiate this solar cell from another solar cell (e.g., a "second" solar cell).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

Methods and systems for solar cell stringer calibration are described herein. Although much of the specification is described in terms of photovoltaic wafers and solar cell stringers, the disclosure applies equally to other semiconductor wafers and semiconductor processing tools with tacking heads and/or soldering stations. In the following description, numerous specific details are set forth, such as specific process flow operations, in order to provide a thorough understanding of embodiments of the present disclosure. It will be apparent to one skilled in the art that embodiments of the present disclosure may be practiced without these specific details. In other instances, well-known fabrication techniques, such as induction soldering, are not described in detail in order to not unnecessarily obscure embodiments of the present disclosure. Furthermore, it is to be understood that the various embodiments shown in the figures are illustrative representations and are not necessarily drawn to scale. For example, although some exemplary embodiments are described with respect to an induction soldering stringer, stringers employing non-induction soldering techniques could benefit from similar calibration jigs. For example, embodiments may also be used to calibrate hot air stringers, contact stringers, and radiant infrared (IR) stringers.

Disclosed herein are methods of calibrating a solar cell stringer. In an embodiment, a method of calibrating a solar cell stringer includes loading a base having one or more pressure sensors into the solar cell stringer. The base is to be positioned under a tacking head of the solar cell stringer. The method involves lowering the tacking head onto the base, and measuring the pressure applied by the tacking head with the one or more pressure sensors of the base. The method involves determining whether the pressure applied by the tacking head is within a predetermined range. If the pressure applied is determined to be outside a predetermined range, the method involves adjusting the solar cell stringer.

In another embodiment, a method of calibrating a solar cell stringer involves heating a solder joint (e.g., via induction soldering or another stringing technique). The method involves measuring the temperature of the solder joint with a pyrometer and a temperature sensor. The temperature sensor is disposed under the solder joint. The method involves determining a location of the pyrometer relative to the solder joint based on a difference in temperatures measured with the pyrometer and the temperature sensor. If the location of the pyrometer is determined to be outside a predetermined range, the method involves adjusting the solar cell stringer.

In another embodiment, a method of calibrating a solar cell stringer involves positioning an induction soldering coil above a solder joint and passing an AC current through the induction soldering coil. The method involves measuring a current in a second metal coil disposed under the solder joint while the AC current is flowing in the induction soldering coil. The method further involves determining a location of the induction soldering coil relative to the solder joint based on the measured current in the second metal coil. If the location of the induction soldering coil is determined to be outside a predetermined range, the method involves adjusting the solar cell stringer.

In another embodiment, a method involves applying pressure to a second solder joint with a holding pin. The method involves measuring, with a pressure sensor disposed under the solder joint, the pressure applied to the solder joint with the holding pin. The method involves determining a location of the holding pin relative to the solder joint based on the measured pressure, and adjusting the solar cell stringer if the location of the holding pin is determined to be outside a predetermined range.

Also disclosed herein are systems for calibrating a solar cell stringer. In one embodiment, a calibration system includes a base loadable into the solar cell stringer in a location under a tacking head. The base includes one or more pressure sensors. The system also includes a computing device that is communicatively coupled with the one or more pressure sensors. The computing device is configured to receive pressure measurements taken when the tacking head is lowered onto the base. The computing device determines whether the pressure measurements are within a predetermined range.

In another embodiment, a calibration system for a solar cell stringer includes a test jig with a metal coil. The test jig is configured to be disposed under a solder joint. A current sensor is configured to measure a current in the metal coil while AC current is flowing in an induction soldering coil disposed above the solder joint. The system also includes a computing device communicatively coupled with the current sensor and configured to receive the current measured in the second metal coil. The computing device is further configured to determine a location of the induction soldering coil relative to the solder joint based on the measured current in the second metal coil.

In another embodiment, a solar cell stringer includes a conveyor system configured to support and convey solar cells loaded into the solar cell stringer. An induction soldering coil is configured to be positioned above a solder joint of the loaded solar cells. An AC current source is configured to apply an AC current to the induction soldering coil. A current sensor is configured to measure a current in a second metal coil disposed under the solder joint while the AC current is flowing in the induction soldering coil. The system also includes a computing device communicatively coupled with the current sensor and configured to receive the current measured in the second metal coil. The computing device is further configured to determine a location of the induction soldering coil relative to the solder joint based on the measured current in the second metal coil.

Thus, embodiments of the present disclosure enable accurate calibration and alignment of solar cell stringer components, which can improve throughput, yield, and minimize reworking due to such misalignments.

FIG. 1 is a block diagram of a solar cell stringer 100 in which embodiments may be implemented, in accordance with an embodiment of the present disclosure. A solar cell stringer "strings" together solar cells by electrically coupling the solar cells (e.g., with metal interconnects). The illustrated embodiment includes a conveyor system 102 configured to support and convey solar cells loaded into the solar cell stringer. The conveyor system may also include a mechanism for loading solar cells and unloading soldered solar cells or strings. The conveyor system 102 may include moveable stages or a conveyor belt, for example, configured to move solar cells amongst processing stations. Processing stations may perform processing operations involved in electrically coupling the solar cells or electrically evaluating the solar cells or diodes. For example, the solar cell stringer 100 illustrated in FIG. 1 includes a tacking head 104 and a soldering station 107 disposed over the conveyor system 102. The tacking head 104 may be configured to adhere solar cell strings to a carrier with an encapsulant, as described in more detail below with respect to FIG. 3. The soldering station 107 solders the solar cells together, for example, by soldering metal contacts on the solar cells with metal interconnects.

The exemplary soldering station 107 uses induction soldering to electrically couple solar cells. However, as indicated above, other embodiments may involve other techniques for electrically coupling solar cells. For example, embodiments may include hot air stringing, contact stringing, radiant IR stringing, or any other stringing technique resulting in heat and/or pressure applied to the solar cells. The embodiment illustrated in FIG. 1 includes an induction soldering coil 110 configured to be positioned above a solder joint of the loaded solar cells. Prior to soldering, a holding pin 112 lowers down to apply pressure to the interconnects, which enables a good contact between the parts to be soldered. An AC current source 114 is configured to apply an AC current to the induction soldering coil 110. The AC current in the induction soldering coil 110 generates a field that induces current in the solder joint. The current induced in the solder joint generates heat sufficient to melt solder applied to the joint, which physically and electrically couples the parts being soldered (e.g., the interconnects and the solar cell contacts). A pyrometer 108 may also be included to measure a temperature of the solder joint during the soldering process.

A controller (e.g., computing device configured to control the solar cell stringer) 106 is communicatively coupled with one or more of the components of the solar cell stringer 100. The controller 106 to control or configure the components, and/or to receive measurements (e.g., from the pyrometer 108).

Proper alignment of solar cells and the solar cell stringer components can be critical in producing functional and high quality solar cell strings. For example, in embodiments involving "concentrator" solar cells in which a mirror concentrates light onto a string of solar cells, misalignment of the solar cells can result in significant power loss. FIGS. 2A and 2B illustrate two examples of concentrator solar cell strings, in accordance with embodiments of the disclosure. FIG. 2A is a block diagram illustrating an example of a well-aligned string 200A of solar cells 202 on a carrier 204. FIG. 2B is a block diagram illustrating an example of a string 200B of misaligned solar cells 202 on a carrier 204. FIG. 2B illustrates a string 200B of solar cells that is straight, but offset from an expected center line; however, other types of misalignments are possible. For example, the string 200B of solar cells could be non-straight, diagonal (e.g., at an angle with respect to an expected center line), or curved. A concentrated light beam 206 is directed onto the solar cells 202 from a mirror (not shown). As can be seen in FIG. 2B, a slight misalignment of the solar cells 202 (e.g., misalignment on the order of millimeters for smaller solar cells) can result in significantly less light reaching the solar cells 202. Additionally, misalignment of elements of the stringer relative to the solar cells during the stringing process may result in other problems, such as poorly soldered or damaged solar cells. Poorly soldered or damaged solar cells may require rework, reduce solar cell efficiency, or even render the solar cells inoperative.

Figure 3A:
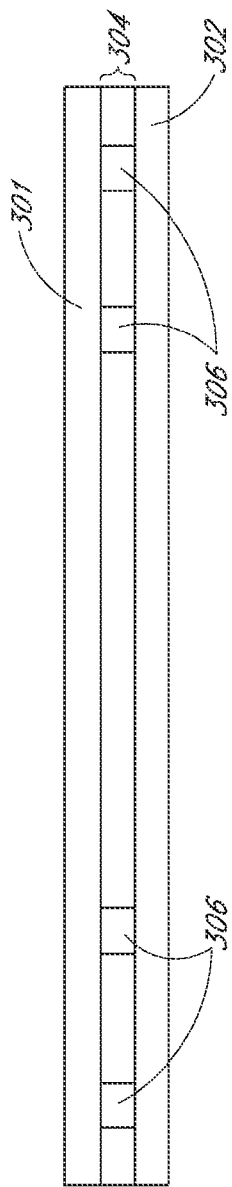
FIG. 3A is a cross-sectional view of a solar cell string tacked to a carrier with an encapsulant, in accordance with an embodiment of the present disclosure.
Figure 3B:
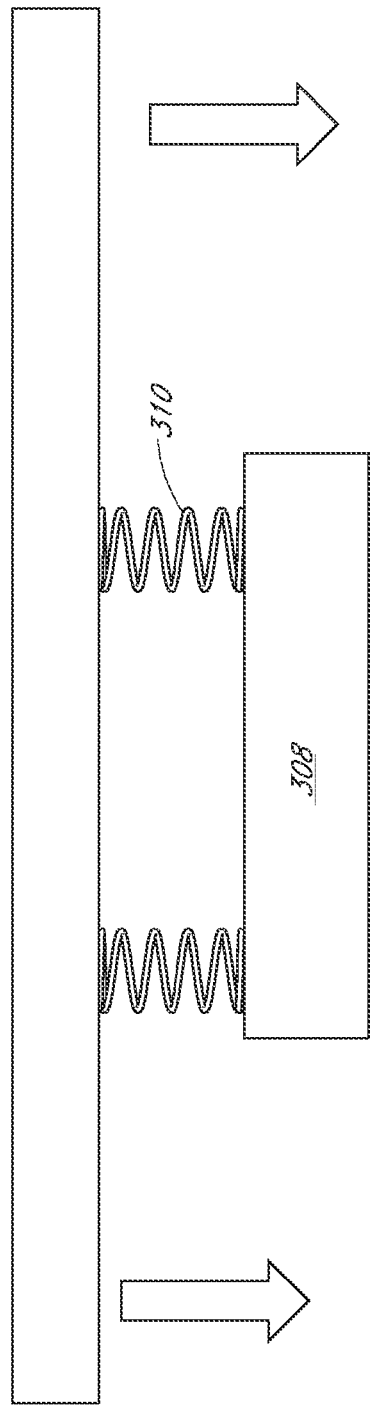
FIG. 3B is a cross-sectional view of a tacking head for attaching solar cell strings to a carrier, in accordance with an embodiment of the present disclosure.
Figure 3B:
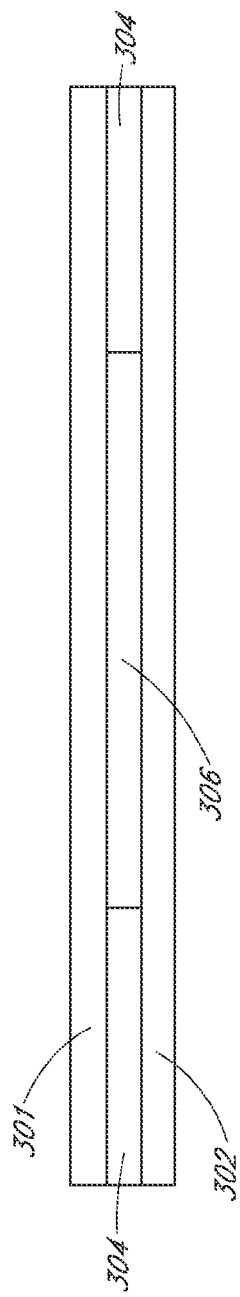

Even if the stringer itself keeps the cells in alignment, the solar cell strings may become misaligned during or after offloading from the stringer. For example, misalignment may occur after the string has been removed from the stringer and goes through subsequent processing stations for completion prior to lamination (where everything is locked into place). Movement of the solar cells amongst different stations may cause solar cells to shift from their original positions relative to a carrier. Therefore, after offloading the solar cells as a completed string from the stringer and prior to moving solar cells amongst other processing stations, the solar cells are typically adhered or "tacked" to a carrier. FIG. 3A illustrates a solar cell string 301 tacked to a carrier 302. FIG. 3B is a cross-sectional view of a tacking head for attaching solar cell strings 301 to the carrier 302, in accordance with an embodiment of the present disclosure. The carrier 302 may include glass, or other suitable material for supporting a solar cell string 301 during the fabrication process. Tacking the solar cells 301 to the carrier 302 may involve applying an encapsulant 304 (e.g., an adhesive material) to the surface of the carrier 302 in one or more areas. In an embodiment, the encapsulant 304 may thus be used as a temporary adhesive to adhere the solar cell strings 301 to the carrier 302 during the fabrication process. In the illustrated example, the encapsulant 304 is applied as a blanket layer over the carrier 302. A tacking head 308 is then lowered over the solar cells 301 in the regions 306. The tacking head 308 may also be heated to specific temperatures, and therefore apply heat to the regions 306 in addition to pressure.

In the embodiment illustrated in FIG. 3B, the tacking head 308 is moved down using motion actuators and springs 310 to compress regions 306 of the solar cell string 301 (e.g., the metal bus bar regions of the solar cell string 301). The downward force and/or temperature allow the encapsulant to melt in the regions 306 and adhere to the solar cell string 301 and the carrier 302. The encapsulant 304 may be a material that can be softened by applying heat and/or pressure, and pressed between the solar cell string 301 and the carrier 302. For example, the encapsulant 304 may be an ethylene vinyl acetate or a poly vinyl butyral, according to embodiments. According to embodiments, the encapsulant 304 once melted has liquid like properties that enable the softened or melted encapsulant to flow and form an area of intimate contact with the solar cell string 301 and the carrier 302. The encapsulant also has solid like properties (e.g., such that the softened or melted encapsulant transitions into a solid when cooled) to provide sufficient support to the solar cell string 301 and minimize failures at the interfaces between the encapsulant, the solar cell string 301, and the carrier 302.

According to embodiments, a minimum total force per region 306 may be necessary to effectively adhere the encapsulant to the solar cell 301 and the carrier 302. The total force applied to each region 306 may depend on, for example, force per unit area and total area of intimate contact. Thus, high adhesion may arise from high surface area of contact between the encapsulant 304 and the surfaces of the solar cell string 301 and the carrier 302, and high attractive interactions between surfaces. High attractive interactions between the encapsulant 304 and the surfaces of the solar cell string 301 and the carrier 302 depend on the material properties of the encapsulant 304, the solar cell string 301, and/or the carrier 302.

According to embodiments, achieving high areas of intimate contact may be achieved by applying sufficient and uniform pressure and/or heat (e.g., with the tacking head 308). If insufficient or non-uniform pressure or heat are applied, the solar cell string 301 may detach from the encapsulant as the solar cell string 301 is moved through the different processes. However, applying too much pressure or heat may cause damage to the solar cell string 301 or the carrier 302.

According to some embodiments, multiple tacking heads may be used to tack the solar cell string to the carrier at multiple locations, as illustrated by the tacked regions 306 of FIG. 3A. In one such embodiment, if one of the tacking heads applies a different (e.g., insufficient) pressure, the solar cell string 301 may detach at that location, which may ultimately result in the solar cell string 301 detaching in even the well-tacked locations. Therefore, a single tacking head failure may result in misalignment of the entire solar cell string 301. However, a single faulty taking head may be difficult to identify due to detachment of the solar cell string 301 at all tacked locations. Additionally, the pressure and/or heat applied by the tacking head 308 may change over time due to, for example, degradation or failure of components (e.g., the springs 310 or the heating element) of the tacking head 308.

Figure 4:
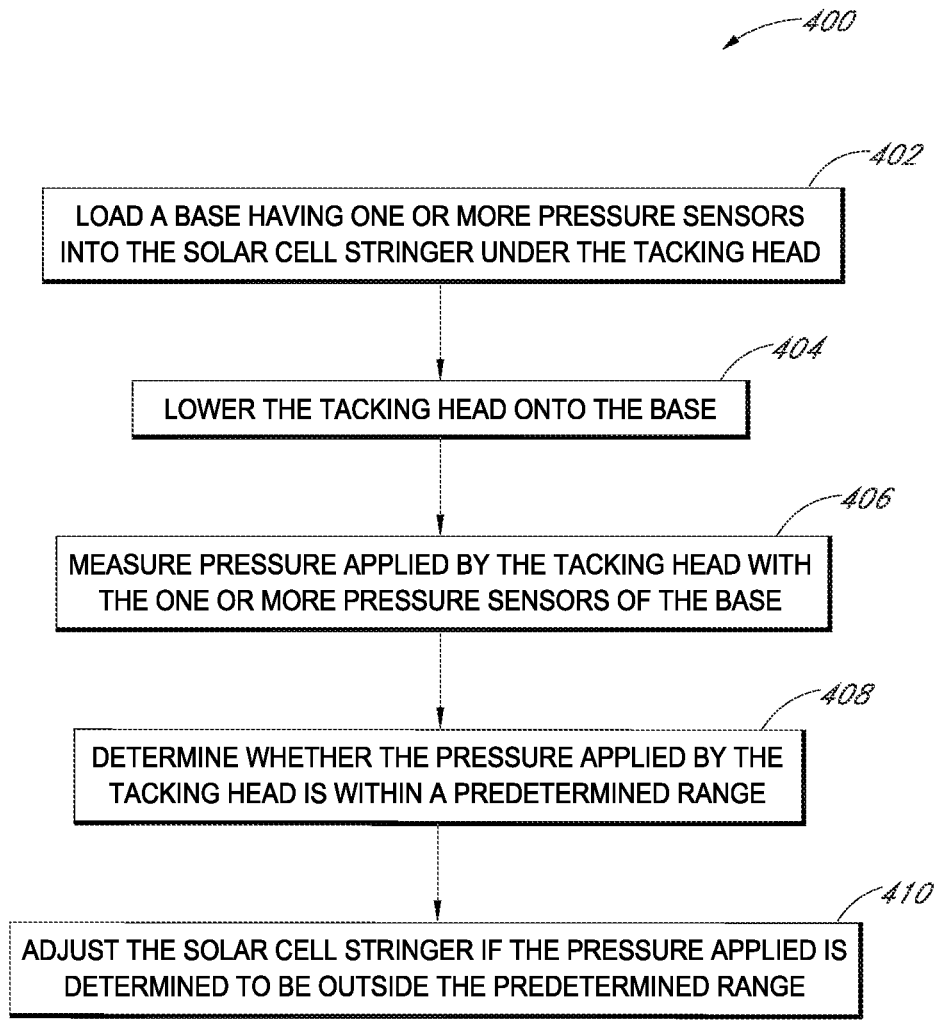
FIG. 4 is a flowchart illustrating operations in a method of calibrating a solar cell stringer, including measuring pressure applied by a tacking head of the solar cell stringer, in accordance with an embodiment of the present disclosure.

According to embodiments, a method of calibration of a solar cell stringer involves calibrating the tacking heads to ensure the heads are applying pressure and/or heat within a predetermined range. FIG. 4 is a flowchart illustrating operations in a method 400 of calibrating a solar cell stringer in accordance with an embodiment of the present disclosure.

The method 400 begins with loading a base having one or more pressure sensors into the solar cell stringer at operation 402. The loaded base is to be positioned under a tacking head (e.g., the tacking head 308) of the solar cell stringer. Loading the base into the solar cell stringer may involve loading the base into a position that a solar cell is in during operation of the solar cell stringer. In an embodiment with multiple tacking heads, the base may have sensors positioned under each of the plurality of tacking heads of the solar cell stringer. In other embodiments, the base may have sensors positioned under less than all of the tacking heads of the solar cell stringer. In one such embodiment, the base may be loaded under different tacking heads at different times.

Figure 5A:
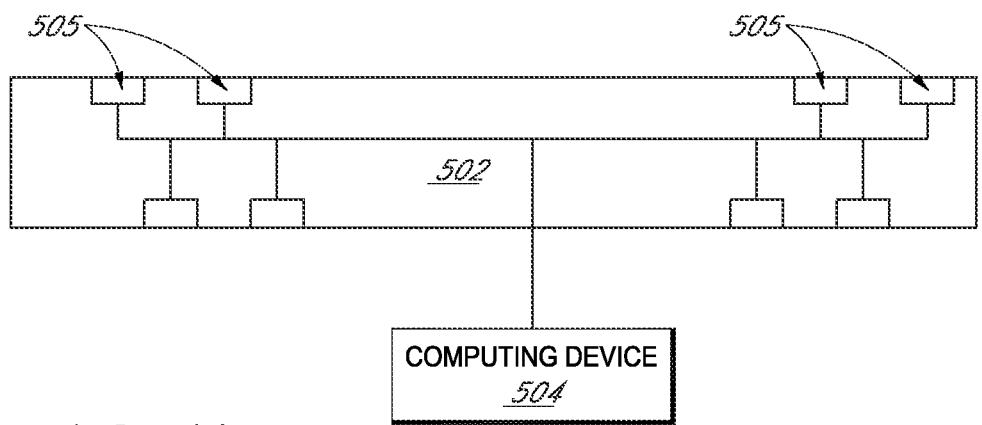
FIG. 5A illustrates a top-down view of a base having one or more pressure sensors to be positioned under a tacking head of the solar cell stringer for calibration of the solar cell stringer, in accordance with an embodiment of the present disclosure.
Figure 5B:
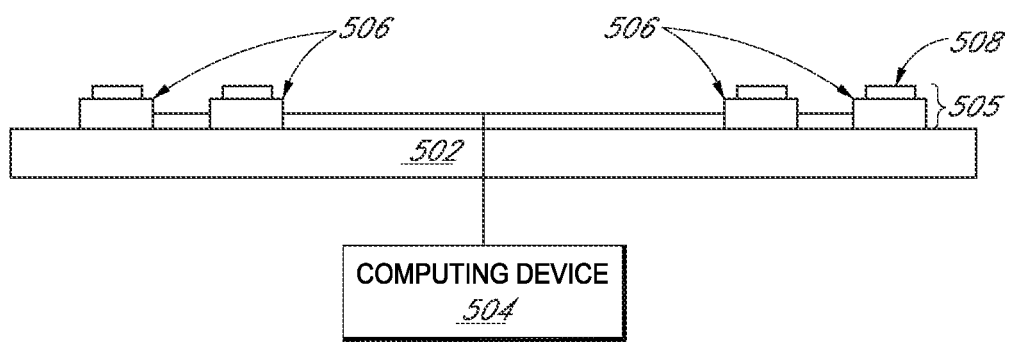
FIG. 5B illustrates a cross-sectional view of a base having one or more pressure sensors to be positioned under a tacking head of the solar cell stringer for calibration of the solar cell stringer, in accordance with an embodiment of the present disclosure.

FIG. 5A illustrates a top-down view of a base 502 having sensors 505 to be positioned under a tacking head of the solar cell stringer, in accordance with an embodiment of the present disclosure. FIG. 5B illustrates a cross-sectional view of the base 502 of FIG. 5A, in accordance with an embodiment of the present disclosure. According to the embodiment illustrated in FIG. 5B, the sensors 505 include temperature sensors 508 stacked over pressure sensors 506. Thus, as illustrated, the temperature sensors may be disposed on or in the base 502, and a temperature sensor 508 may be disposed on or in each of the one or more pressure sensors. The temperature sensors 508 may be thermocouples or other appropriate temperature sensors. In an embodiment where the temperature sensors 508 are stacked over the pressure sensors 506, the temperature sensors 508 include sensors capable of withstanding the pressure applied by the tacking head. In other embodiments, the pressure sensors 506 and/or temperature sensors 508 may be partially or fully embedded in the base 502.

Returning to FIG. 4, the method 400 involves lowering the tacking head onto the base 502, at operation 404. According to embodiments, the tacking head is lowered onto the base 502 in the same way as the tacking head is lowered over the solar cell strings. Thus, in embodiments, the base 502 and the sensors 505 have a height that is substantially the same as a solar cell string would have during operation of the solar cell stringer. In an embodiment with a heated tacking head, the method may also involve heating the base with the tacking head.

At operation 406, the method involves measuring pressure applied by the tacking head with the pressure sensors 506 of the base. In an embodiment with temperature sensors, the method may also involve measuring the temperature of the tacking head. In the embodiments illustrated in FIGS. 5A and 5B, a computing device 504 is communicatively coupled with the sensors 505 and configured to receive measurements when the tacking head is lowered onto the base 502. The computing device 504 may then correlate the expected vertical position of the motion actuator and pressure applied on the solar cell string. According to an embodiment, the computing device 504 is also configured to determine whether the pressure and/or temperature measurements are within a predetermined range, at operation 408.

At operation 410, the computing device 504 is to further adjust one or more parameters of the solar cell stringer if the pressure measurements are outside of the predetermined range. Adjusting the solar cell stringer may involve, for example, configuring a motion actuator to lower the tacking head to a different vertical position. In another embodiment, adjusting the solar cell stringer may involve adjusting heater (s) in the tacking head to compensate for any difference in the expected and measured temperatures. Such adjustments may be made manually, or automated by one or more computing devices such that the computing device(s) receive measurements from the base 502 and controls or configures the solar cell stringer to achieve pressures and/or temperatures within a desired range.

Thus, according to embodiments, a method and system of calibration may ensure uniform pressure and/or temperature are applied by one or more tacking heads of a solar cell stringer to minimize solar cell string misalignment. Performance of a calibration method such as the method 400 of FIG. 4 on periodic basis (e.g., every week or other time frame), can enable identification of changes in applied pressure or temperature by the tacking head(s) as a result of, e.g., degradation of the equipment prior to production of misaligned or faulty solar cell strings.

Turning again to FIG. 1, other sources of faulty or lower quality solar cell strings includes the misalignment of elements of the soldering station 107. As discussed above, induction soldering involves running a current through the induction soldering coil 110, which can induce a current in a solder joint positioned near the induction soldering coil 110. The physical alignment of the soldering coil 110 relative to the solder joint can be critical to achieve a temperature for proper soldering. A solder joint temperature that is too low or too high may result in defects that may require re-work or failures in the field. Currently, aligning induction soldering coils 110 and other elements of the soldering station 107 relative to solder joints involves adjusting the position of the elements by eye or using a feeler gauge of known thickness. The temperature of the solder joint may also be measured with a pyrometer (e.g., the pyrometer 108 of FIG. 1), but the pyrometer may also be misaligned, resulting in inaccurate measurements. Such existing methods can be ineffective, inconsistent, and time-consuming.

Figure 6A:
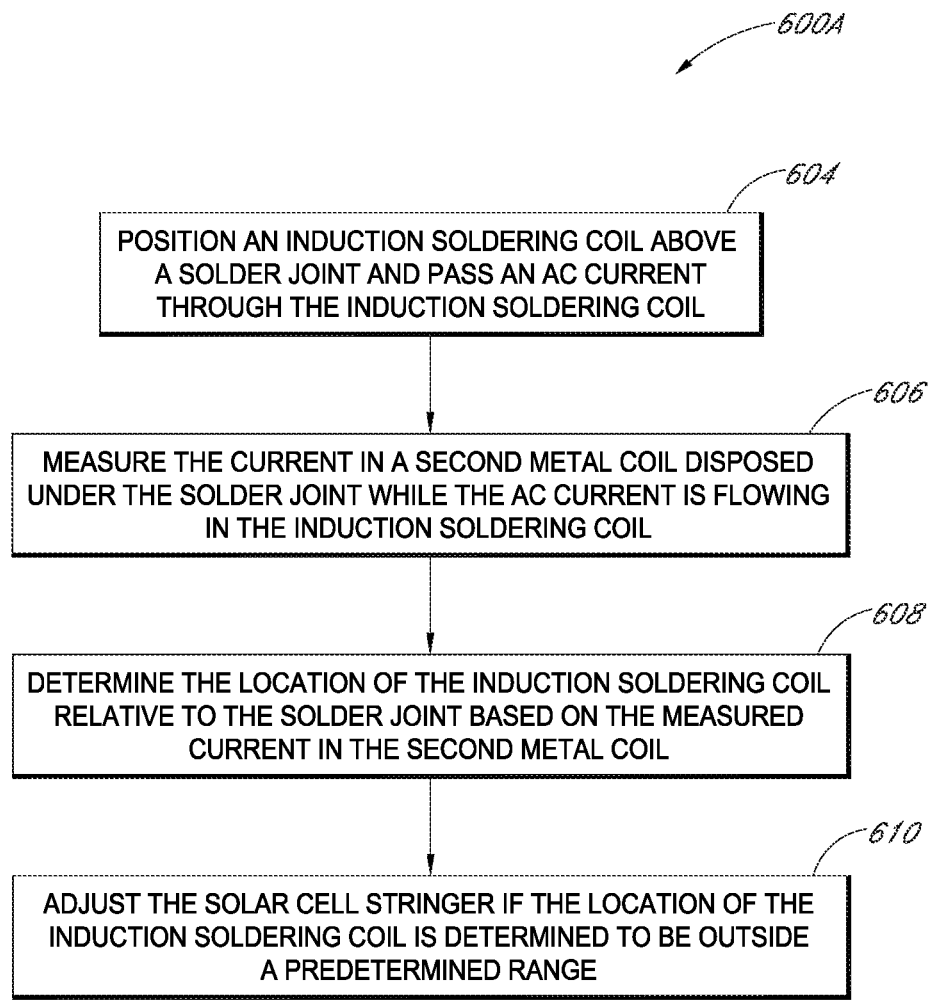
FIG. 6A is a flowchart illustrating operations in a method of calibrating a solar cell stringer, including determining the location of an induction soldering coil relative to a solder joint, in accordance with an embodiment of the present disclosure.
Figure 6B:
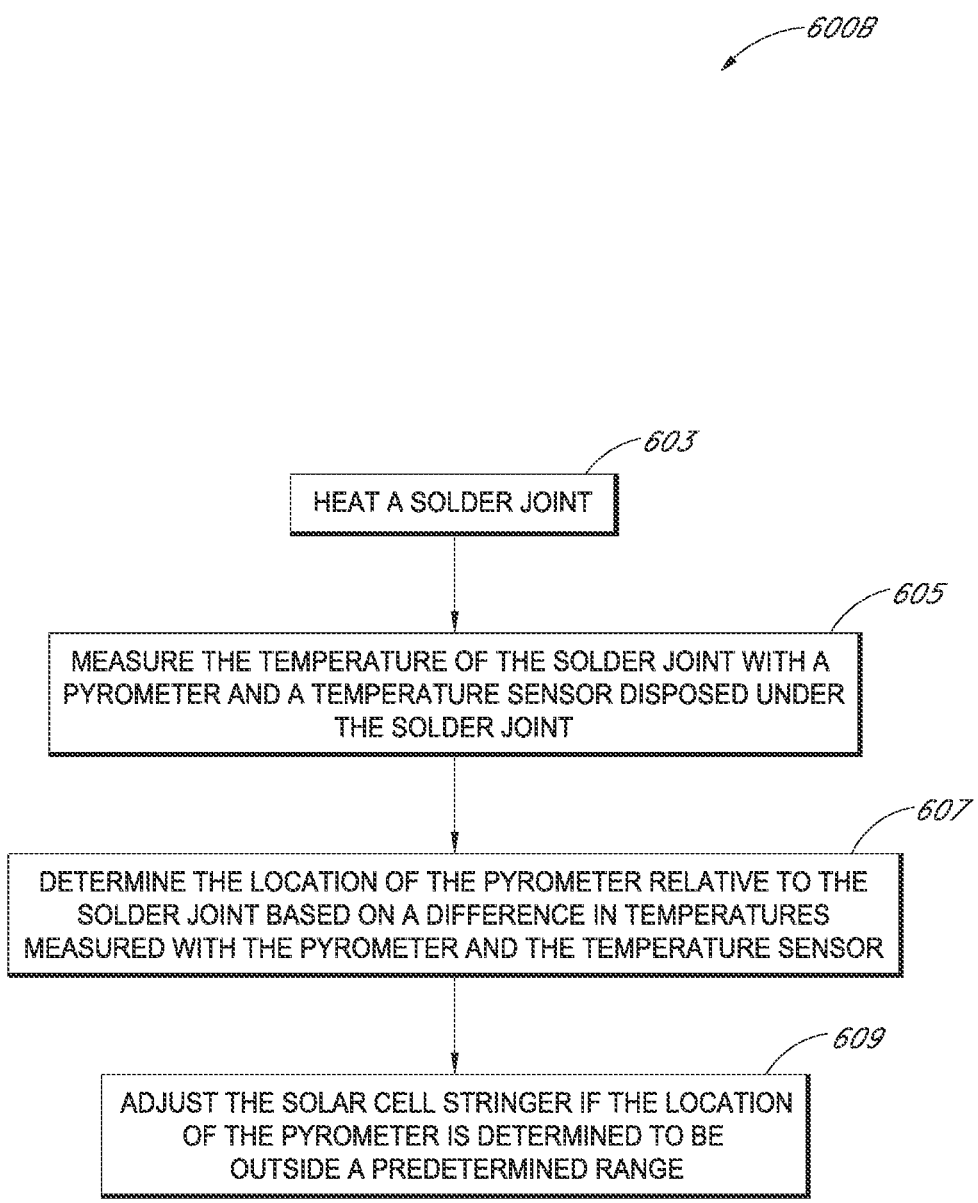
FIG. 6B is a flowchart illustrating operations in a method of calibrating a solar cell stringer, including determining the location of a pyrometer relative to a solder joint, in accordance with an embodiment of the present disclosure.
Figure 6C:
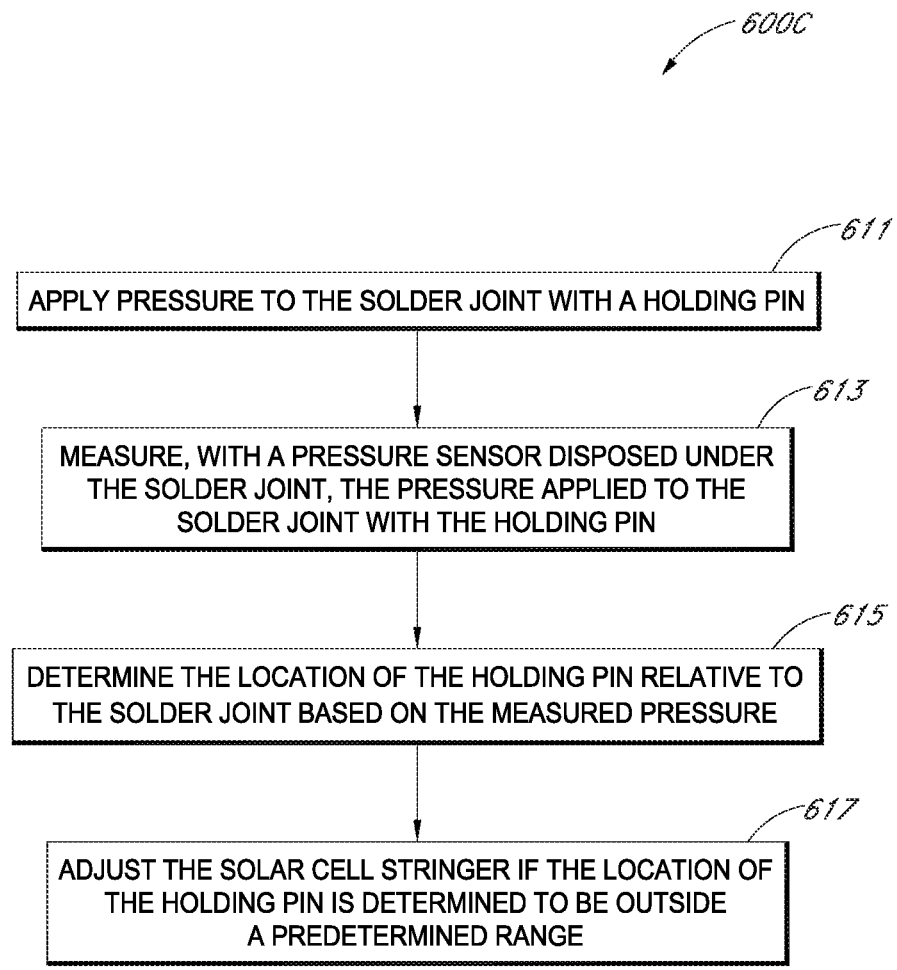
FIG. 6C is a flowchart illustrating operations in a method of calibrating a solar cell stringer, including determining the location of a holding pin relative to a solder joint, in accordance with an embodiment of the present disclosure.

FIGS. 6A-6C are flowcharts illustrating methods of calibrating a solar cell stringer, including determining the location of elements of a soldering station, in accordance with embodiments of the disclosure.

Turning to FIG. 6A, the method 600A involves a solar cell stringer employing induction soldering techniques to string solar cells together. The solar cell stringer can be similar to the solar cell stringer 100 discussed above with respect to FIG. 1. Calibration of the solar cell stringer may be performed with or without solar cells loaded into the solar cell stringer. Thus, the method 600A may begin with loading solar cells into a solar cell stringer. In other embodiments, calibration is performed with the test jig without actually loading the solar cells into the solar cell stringer. Performing calibration with the test jig prior to loading solar cells into the solar cell stringer may enable alignment of soldering station elements prior to soldering the solar cells. Therefore, alignment problems may be resolved prior to soldering, which may reduce soldering defects and rework of poorly soldered solar cells. Performing calibration while solar cells are loaded into the solar cell stringer may enable periodic calibration without interrupting the fabrication process. At operation 604, the method 600A involves positioning an induction soldering coil above a solder joint and passing an AC current through the induction soldering coil. As discussed above, alignment of the induction soldering coil relative to the solder joint can be critical to achieve a desired temperature at the solder joint, and to ensure the solar cell contacts and interconnects are not over-soldered or under-soldered.

Figure 7:
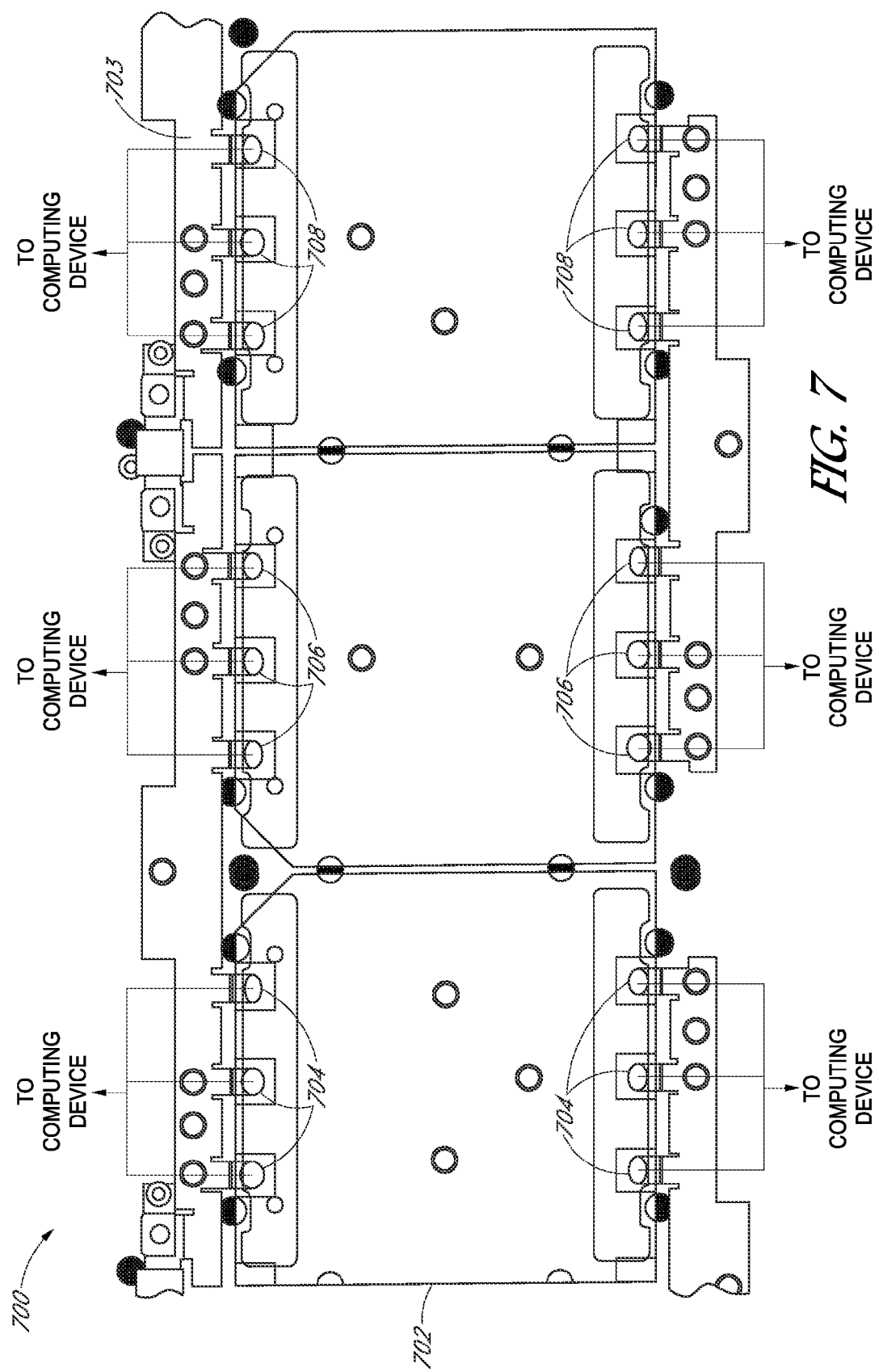
FIG. 7 is a top down view of a test jig configured to be disposed under a solder joint of solar cells loaded into a solar cell stringer, in accordance with an embodiment of the present disclosure.

According to an embodiment, while the AC current is flowing in the induction soldering coil, the method 600A involves measuring the current in a second metal coil disposed under the solder joint. The second metal coil may be embedded in the solar cell stringer, or may be a part of a test jig used for calibrating the solar cell stringer, according to embodiments. FIG. 7 is a top down view of an exemplary test jig 700 configured to be disposed under a solder joint, in accordance with an embodiment of the present disclosure. Loaded solar cells are supported over the regions 702 of the test jig 700, and metal interconnects 703 are placed and soldered to the solar cells. In the illustrated embodiment, metal coils 704 are disposed under each solder joint, and thus under metal interconnects 703. However, as mentioned above, solar cells may not be loaded into the solar cell stringer when performing calibration with the test jig 700.

A current sensor, which may be located with each of the metal coils 704, is configured to measure a current in a given metal coil while AC current is flowing in an induction soldering coil disposed above the solder joint, at operation 606. The test jig 700 of FIG. 7 may be a part of a calibration system for a solar cell stringer that further includes a computing device communicatively coupled with the current sensors. Thus, the computing device may be configured to receive the current measured in the metal coils 704. The computing device is further configured to determine a location of the induction soldering coil relative to the solder joint based on the measured current in the metal coils 704, at operation 608. In one example, if the measured current in the metal coils 704 is within a predetermined current range, the induction soldering coil is determined to be aligned with the solder joint. If the measured current in the metal coils 704 is outside the predetermined current range, the induction soldering coil is determined to be misaligned relative to the solder joint. If the induction soldering coil is not aligned with the solder joint, the method 600A may involve adjusting the solar cell stringer, at operation 610. Adjusting the solar cell stringer may involve, for example, adjusting the location of the induction soldering coil relative to the solder joint.

In one embodiment, the test jig 700 includes more than one metal coil under a solder joint, and current sensors to measure the current induced by the induction soldering coil in each of the metal coils. The computing device may then compare the current induced in each of the metal coils to identify the location of the induction soldering coil with greater accuracy. For example, in an embodiment with multiple metal coils (e.g., 2, 3, or more metal coils) under a given solder joint, if a greater current is induced in one of the coils, the computing system determines the induction soldering coil is closer to the metal coil with the greatest induced current.

Turning to FIG. 6B, the method 600B is another method of calibrating a solar cell stringer, including determining the location of a pyrometer relative to a solder joint, in accordance with an embodiment of the present disclosure. Similar to the method 600A of FIG. 6A, the method 600B may be performed with or without solar cells loaded into the solar cell stringer. The method 600B begins with heating a solder joint, at operation 603. Heating the solder joint may involve induction soldering (such as the induction soldering described with reference to FIG. 1), or any other method of heating the solder joint to electrically couple solar cells. For example, embodiments may employ other non-induction soldering techniques such as heating the solder joint with hot air or IR radiation.

At operation 605, the method 600B involves measuring the temperature of the solder joint with a pyrometer and another temperature sensor that is disposed under the solder joint (e.g., when AC current is flowing in an induction soldering coil or when the solder joint is heated using another technique). The pyrometer may be positioned above the solder joint, such as the pyrometer 108 of FIG. 1. The temperature sensor, similar to the metal coil discussed above, may be a part of the solar cell stringer or a separate test jig. For example, turning again to FIG. 7, the test jig 700 may further include temperature sensors 706 configured to be disposed under a solder joint of loaded solar cells. The temperature sensor may be a thermocouple or other temperatures sensor capable of being disposed under the solder joint to measure the temperature of the solder joint. Thus, in addition to measuring the temperature of the solder joint with a pyrometer, the calibration system also measures the temperature of the solder joint with a temperature sensor disposed under the solder joint.

At operation 607, the method 600B involves determining the location of the pyrometer relative to the solder joint based on a difference in temperatures measured with the pyrometer and the temperature sensor. For example, if the temperature measurements from the pyrometer vary too much from the measurements taken with the other temperature sensor, the pyrometer may be determined to be too far from the solder joint or have an improper angle with respect to the solder joint. If the location of the pyrometer is incorrect (e.g., if the location of the pyrometer relative to the solder joint is determined to be outside a second predetermined range), the method 600B may involve adjusting the solar cell stringer, at operation 609. For example, the method may involve adjusting the angle or distance of the pyrometer relative to the solder joint. In another embodiment, adjusting the solar cell stringer may involve compensating for a determined inaccuracy of the pyrometer (e.g., by offsetting measurements from the pyrometer by a determined value).

In one embodiment, the test jig 700 includes more than one temperature sensor under a solder joint. The computing device may then use the temperature measurements from each of the temperature sensors (e.g., by averaging the temperature measurements) to determine the temperature of the solder joint. In one embodiment, the temperature measurements made with each of the temperature sensors under a given solder joint may be used to help identify the location of the induction soldering coil with better accuracy. For example, in an embodiment with multiple (e.g., 2, 3, or more) temperature sensors under a solder joint, if a higher temperature is measured with one of the temperature sensors, the computing system determines the induction soldering coil is closer to the temperature sensor with the highest temperature.

Turning to FIG. 6C, the method 600C is another method of calibrating a solar cell stringer, including determining the location of a holding pin relative to a solder joint, in accordance with an embodiment of the present disclosure. Similar to the method 600A of FIG. 6A, the method 600C may be performed with or without solar cells loaded into the solar cell stringer. The method 600C begins with applying pressure to the solder joint with a holding pin (e.g., the holding pin 112 of FIG. 1), at operation 611. The pressure applied by the holding pin enables a good connection to be formed during soldering. If the holding pin is misaligned, or applying either too much or too little pressure, the soldering may be ineffective (or cause damage to the system). Typical existing solar cell stringers have no means for testing the correct operation and position of the holding pin.

According to embodiments, the method 600C involves measuring, with a pressure sensor disposed under the solder joint, the pressure applied to the solder joint with the holding pin, at operation 613. For example, turning to FIG. 7, the test jig 700 may include pressure sensors 708 configured to be disposed under solder joints. The location of the holding pin may then be determined relative to the solder joints based on the measured pressure, at operation 615. The method may also include determining if the holding pins are applying pressure within an expected range. If the location or applied pressure of the holding pin is determined to be outside a predetermined range, the method involves adjusting the solar cell stringer, at operation 617. Adjusting the solar cell stringer may involve, for example, adjusting the pressure or location of the holding pin relative to the solder joint. The adjustments discussed above in FIGS. 6A-6C may be made manually, or automated by one or more computing devices such that the computing device(s) receive measurements from the current sensors that are coupled with the metal coils 704, the temperature sensors 706, and/or the pressure sensors 708. The computing device(s) may then control or configure the solar cell stringer to achieve desired alignment, pressure, and/or temperatures at the solder joints.

Similar to the embodiments described above with multiple metal coils and/or multiple temperature sensors under a given solder joint, in one embodiment, the test jig 700 includes more than one pressure sensor under a solder joint. The computing device may then compare the pressure measurements made with each of the pressure sensors to identify the location of the holding pin with greater accuracy. For example, in an embodiment with multiple pressure sensors (e.g., 2, 3, or more pressure sensors) under a given solder joint, if a greater pressure is measured with one of the pressure sensors, the computing system determines the holding pin is closer to the pressure sensor with that measured the greatest pressure.

Although the methods 600A, 600B, and 600C are described separately, embodiments may implement one or more of the methods in a single solar cell stringer or test jig. In one embodiment, the metal coils, temperature sensors, and pressure sensors are configured to be disposed under different solder joints. For example, in one such embodiment, a coil is disposed under a first solder joint, a temperature sensor is disposed under a second solder joint, and a pressure sensor disposed under a third solder joint. In another embodiment, one or more sensors may be disposed under a single solder joint. For example, the metal coil may be disposed under one solder joint, and a temperature sensor and a pressure sensor may be disposed under a same, second solder joint. Other embodiments may include only one or some of the test jig elements described above. For example, a test jig for calibrating a solar stringer that uses non-induction soldering techniques may not include the metal coils 704, but may include the temperature sensors 706 and/or pressure sensors 708. As indicated above, according to embodiments, the test jig 700 may be configurable for different solar cell designs. For example, referring to FIG. 1, the desired location and properties of the induction soldering coil 110, holding pin 112, and pyrometer 108 may change for different solar cells. Therefore, the location, configuration, and/or number of the metal coils 704, temperature sensors 706, and/or pressure sensors 708 of the test jig 700 may be configured to accommodate the current solar cells being stringed.

In the embodiment illustrated in FIG. 7, the test jig includes six metal coils 704, six temperature sensors 706, and six pressure sensors 708, enabling components at a total of eighteen solder joints to be tested at a given time. As explained above, in the illustrated embodiment, a single coil or sensor is disposed under a given solder joint. Therefore, calibrating all the described components at each solder joint involves moving the test jig under the different solder joints. Other embodiments may include different configurations of metal coils and sensors. For example, as discussed above, some embodiments may include calibrating multiple soldering station elements at each position simultaneously (e.g., with an embodiment having both temperature and pressure sensors under the same solder joint).

References to the metal coils 704, temperature sensors 706, and pressure sensors 708 as being "disposed under a solder joint" are intended to broadly describe that the elements are located near, at, or in an area that is heated during the soldering process.

In one embodiment, a calibration system also includes a mechanism for calibrating the test jig. For example, calibrating the test jig may involve loading mock-up solar cells with interconnects into the solar cell stringer. In one such embodiment, the mock-up solar cells include one or more heating elements at the location of the solder joint. The method involves heating the solder joint with the heating element to a predetermined temperature, and measuring the temperature of the solder joint with the temperature sensor (e.g., the temperature sensors 706 of FIG. 7). Adjustments may be made if a difference in the measured temperature and the predetermined temperature exceeds a threshold. For example, the temperature sensor location may be adjusted or an offset may be added to measurements made by the temperature sensor.

Figure 8:
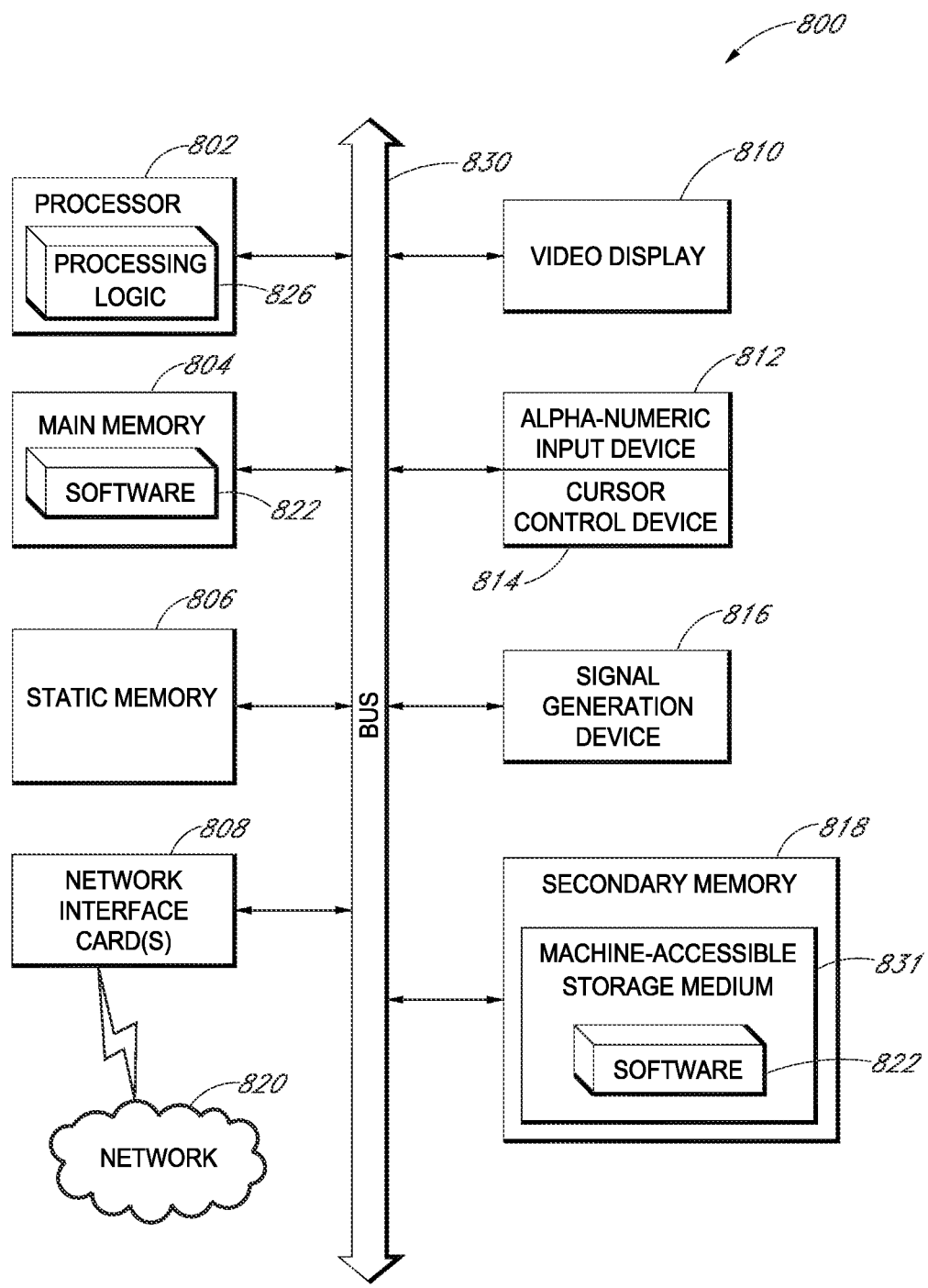
FIG. 8 illustrates a data processing system that may store and execute a set of instructions to perform methods discussed herein, in accordance with an embodiment of the present disclosure.

FIG. 8 illustrates a data processing system (e.g., computer system) that may be configured to store and execute a set of instructions to perform the disclosed techniques, in accordance with an embodiment of the present disclosure. The exemplary data processing system 800 includes one or more processor(s) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, etc. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations discussed herein.

The data processing system 800 may further include a network interface device 808. The data processing system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the data processing system 800, the main memory 804 and the processor 802 also constituting machine-readable storage media. The software 822 may further be transmitted or received over a network 820 via the network interface device 808.

While the machine-accessible storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure.

For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

For example, in one embodiment, a non-transitory machine-accessible storage medium has instructions stored thereon that are executable by a computing device to perform the operations similar to those described in the method 400 of FIG. 4. In one such embodiment, a computing device receives a signal indicating a base (e.g., the base 502 of FIG. 5A) is loaded into a solar cell stringer in a location under a tacking head. The computing device receives a second signal indicating the tacking head has been lowered down to a position to contact the base. The computing device further receives pressure measurements from one or more pressure sensors disposed in or on the base when the tacking head is lowered onto the base, and determines whether the pressure applied by the tacking head is within a predetermined range. In one such embodiment, the computing device sends a third signal to a motion actuator to adjust a vertical position of the tacking head if the pressure is determined to be outside of the predetermined range.

In another example, a non-transitory machine-accessible storage medium has instructions stored thereon that are executable by a computing device to perform the operations similar to those described in the method 600A-600C of FIGS. 6A-6C. In one such embodiment, a computing device receives receiving a signal indicating solar cells are loaded into a solar cell stringer. The computing device receives a second signal indicating an induction soldering coil (e.g., the soldering coil 110 of FIG. 1) of the solar cell stringer is positioned above a solder joint of the loaded solar cells, and further indicating an AC current is flowing in the induction soldering coil. The computing device further receives measurements of a current in a second metal coil (e.g., the metal coils 704 of FIG. 7) disposed under the solder joint of the loaded solar cells. The computing device determines a location of the induction soldering coil relative to the solder joint based on the measured current in the second metal coil. The computing device may further send a third signal to adjust a parameter of the solar cell stringer if the location of the induction soldering coil is determined to be outside a predetermined range.

Thus, solar cell stringer calibration methods and systems have been disclosed. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of calibrating a solar cell stringer, the method comprising:
    loading a base having one or more pressure sensors into the solar cell stringer to be positioned under a tacking head of the solar cell stringer;
    lowering the tacking head onto the base;
    measuring pressure applied by the tacking head with the one or more pressure sensors of the base;

determining whether the pressure applied by the tacking head is within a predetermined range; and adjusting the solar cell stringer if the pressure applied is determined to be outside the predetermined range.

2. The method of claim 1, wherein the base further comprises one or more temperature sensors, and wherein the method further comprises:

heating the base with the tacking head;

measuring a temperature of the base with the one or more temperature sensors of the base;

determining whether the temperature of the base is within a second predetermined range; and adjusting the tacking head if the temperature of the base is determined to be outside of the second predetermined range.

3. The method of claim 1, wherein the one or more pressure sensors are disposed on or in the base, and wherein a temperature sensor is disposed on or in each of the one or more pressure sensors.

4. The method of claim 1, wherein adjusting the solar cell stringer comprises configuring a motion actuator to lower the tacking head to a different vertical position.

5. The method of claim 1, wherein the solar cell stringer comprises a plurality of tacking heads, and wherein the base has a pressure sensor positioned under each of the plurality of tacking heads of the solar cell stringer.

6. The method of claim 1, wherein loading the base into the solar cell stringer comprises loading the base into a position that a solar cell is in during operation of the solar cell stringer.

7. A calibration system for a solar cell stringer, the system comprising:

a base loadable into the solar cell stringer in a location under a tacking head, the base comprising one or more pressure sensors; and a computing device communicatively coupled with the one or more pressure sensors and configured to receive pressure measurements when the tacking head is lowered onto the base; wherein the computing device is configured to determine whether the pressure measurements are within a predetermined range; and to adjust one or more parameters of the solar cell stringer if the pressure measurements are outside of the predetermined range.

8. The calibration system of claim 7, wherein:

the base further comprises one or more temperature sensors; and the computing device is further configured to:

receive temperature measurements of the base from the one or more temperature sensors when the tacking head is lowered onto the base and heated, and determine whether the temperature of the base is within a second predetermined range.

9. The calibration system of claim 8, wherein the one or more pressure sensors are disposed on or in the base, and wherein a temperature sensor is disposed on or in each of the one or more pressure sensors.

10. The calibration system of claim 7, wherein adjusting the one or more parameters comprises sending a signal to configure a motion actuator to lower the tacking head to a different vertical position.

* * * * *